United States Patent [19]

Koch et al.

[11] Patent Number: 4,693,061
[45] Date of Patent: Sep. 15, 1987

[54] IDLER GEAR MOUNTING FOR DISC CUTTERBARS

[75] Inventors: Earl E. Koch, Mohnton; Franja F. Voler, New Holland, both of Pa.

[73] Assignee: New Holland Inc., New Holland, Pa.

[21] Appl. No.: 846,651

[22] Filed: Mar. 31, 1986

[51] Int. Cl.⁴ ............................................ A01D 55/18
[52] U.S. Cl. .......................................... 56/13.6; 56/6
[58] Field of Search .................. 56/6, 13.6, 192, 295, 56/DIG. 6; 384/510, 537, 540, 542, 559, 562, 585; 74/606 R; 403/370, 194, 195, 200, 201, 345, 365, 375

[56] References Cited

U.S. PATENT DOCUMENTS

| 3,604,185 | 9/1971 | Reber et al. | 56/6 |
| 3,916,725 | 11/1975 | Reber | 56/13.6 |
| 4,426,827 | 1/1984 | Oosterling et al. | 56/13.6 |
| 4,468,916 | 9/1984 | Vissers et al. | 56/13.6 |

FOREIGN PATENT DOCUMENTS 1813612 10/1969 Fed. Rep. of Germany ....... 56/13.6

Primary Examiner—Robert Peshock
Assistant Examiner—John G. Weiss
Attorney, Agent, or Firm—Larry W. Miller; Frank A. Seemar; Darrell F. Marquette

[57] ABSTRACT

An improved idler gear mounting apparatus for use in a disc cutterbar to rotatably mount the idler gear transferring rotational power between drive gears operatively associated with disc cutter assemblies disclosed wherein a spacer member engages both the upper surface and the lower surface of the transmission casing to provide radial support thereof and also engages the inner race of a bearing assembly rotatably mounting the idler gear. A bolt having a head portion received within a recessed portion of the spacer member extends through the spacer member and is threadably engaged with a securing member which in turn engages the lower surface member of the transmission casing. A lip portion of the spacer member engaged with the upper surface of the transmission casing permits the mounting apparatus to be secured between the upper and lower surfaces of the transmission casing and rotatably mount the idler gear. O-rings associated with spacer member and the securing member seal the mounting apparatus to prevent the leakage of fluid from the transmission casing.

9 Claims, 7 Drawing Figures

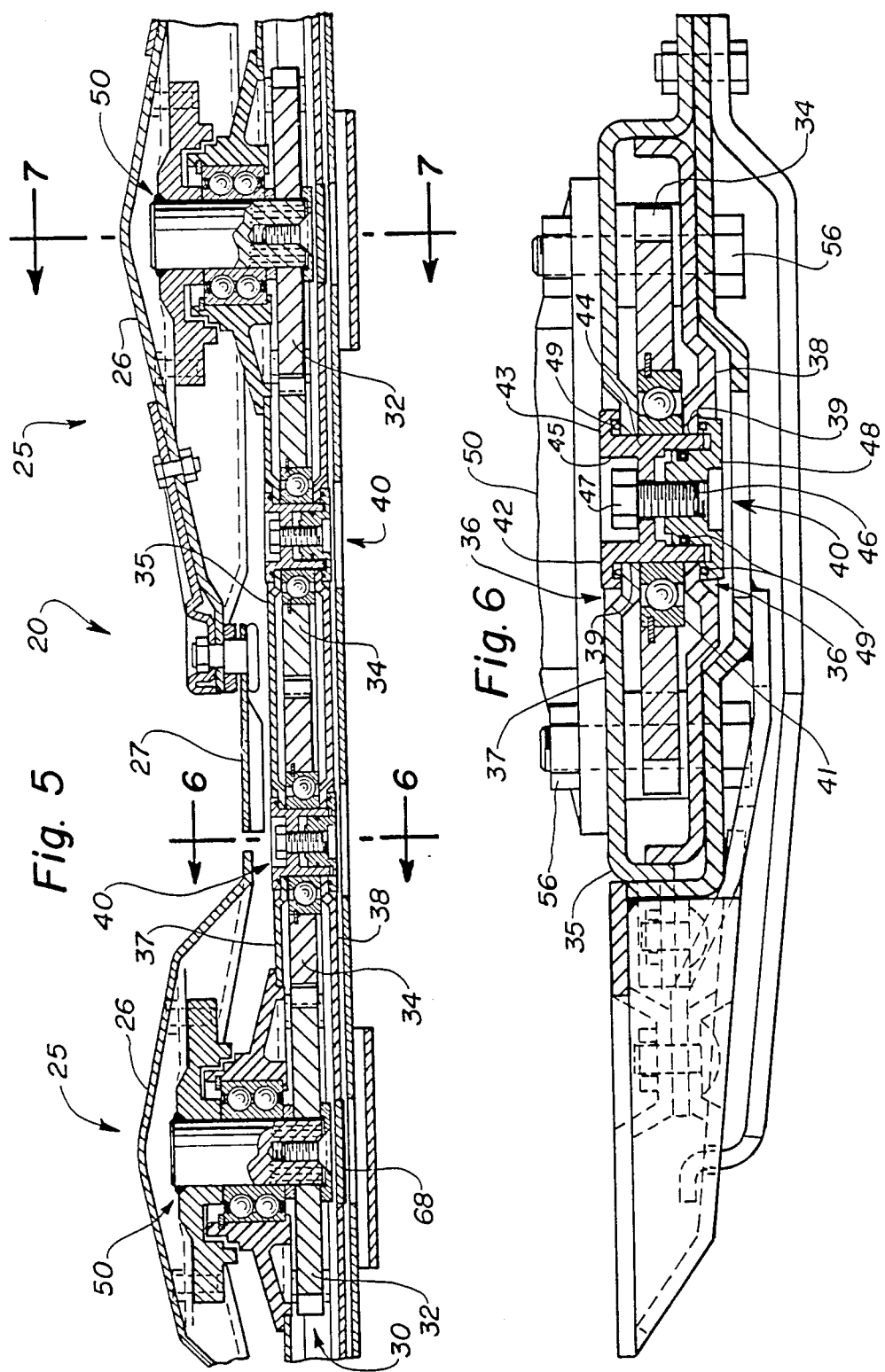

4,693,061

IDLER GEAR MOUNTING FOR DISC CUTTERBARS

BACKGROUND OF THE INVENTION

The present invention relates generally to rotary mowers used for severing standing crop material by impact action and, more particularly, to an improved mounting apparatus for rotatably mounting idler gears between the disc cutter assemblies within the transmission casing.

Disc cutterbars of the type utilizing a plurality of intermeshed gears to transfer rotational power through the transmission casing to the rotatably mounted disc cutter units typically are provided with a pair of idler gears rotatably mounted within the transmission casing between each respective disc cutter assembly. The purpose of this transmission gear configuration is to provide opposing directions of rotation for adjacent disc cutter units.

Because of the precise nature of the intermeshed transmission gears in such disc cutterbars, the location of the idler gear mounting is particularly critical. Furthermore, due to the forces imposed on the idler gear mounting deformation problems with respect to the hole through the casing are also encountered. With the current tendency to manufacture cutterbars with a low, thin profile to keep the cutting member close to the surface of the ground and minimize impedance to the flow of severed crop material over the surface of the disc cutters, a substantial mounting of the idler gears to maintain proper centers and alignment is required.

SUMMARY OF THE INVENTION

It is an object of this invention to overcome the aforementioned disadvantages of the prior art by providing an idler gear mounting having a spacer member extending completely through the transmission casing to engage both the upper and lower surfaces thereof.

It is another object of this invention to position a spacer member for the mounting of an idler gear in a disc cutterbar so that the upper and lower surfaces provide radial support for the idler gear mounting apparatus.

It is an advantage of this invention that a substantial mounting of the idler gears is provided.

It is another advantage of this invention that the manufacturing centers and alignment of idler gears in the power transmission train can be properly maintained.

It is still another object of this invention to provide indentations in the transmission casing so that the idler gear mounting apparatus does not substantially project above or below the surfaces of the transmission casing.

It is a feature of this invention that the idler gear mounting apparatus can be sealed with O-rings to prevent a loss of fluid from within the casing.

It is still another advantage of this invention that the mounting apparatus maintains an ease of serviceability.

It is a further object of this invention to provide an idler gear mounting apparatus for use in a disc cutterbar which is durable in construction, inexpensive of manufacture, carefree of maintenance, facile in assemblage, and simple and effective in use.

These and other objects, features and advantages are accomplished according to the instant invention by providing an improved idler gear mounting apparatus for use in a disc cutterbar to rotatably mount the idler gear transferring rotational power between drive gears operatively associated with assemblies wherein a spacer member engages both the upper surface and the lower surface of the transmission casing to provide radial support thereof and also engages the inner race of a bearing assembly rotatably mounting the idler gear. A bolt having a head portion received within a recessed portion of the spacer member extends through the spacer member and is threadably engaged with a securing member which in turn engages the lower surface member of the transmission casing. A lip portion of the spacer member engaged with the upper surface of the transmission casing permits the mounting apparatus to be secured between the upper and lower surfaces of the transmission casing and rotatably mount the idler gear. O-rings associated with the spacer member and the securing member seal the mounting apparatus to prevent the leakage of fluid from the transmission casing.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 5 is an enlarged partial cross-sectional view of the disc cutterbar taken along lines 5—5 of FIG. 4;

FIG. 6 is an enlarged cross-sectional view of the cutterbar taken along lines 6—6 of FIG. 5 to show the structural details of the idler gear mounting apparatus.

DETAILED DESCRIPTION OF THE PREFERRED EMBODIMENT

Figure 1:
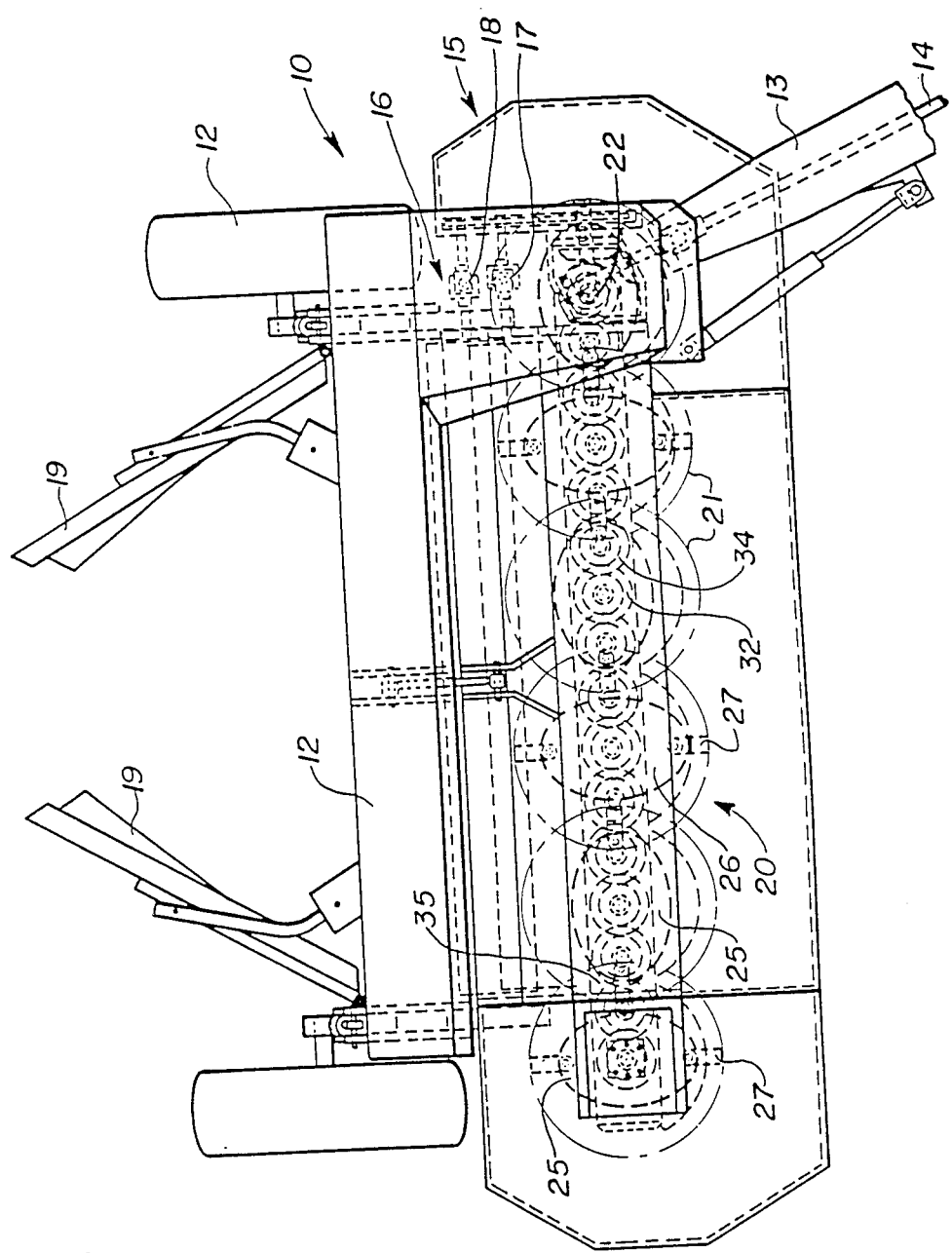
FIG. 1 is a top plan view of a disc mower-conditioner incorporating the principles of the instant invention.
Figure 2:
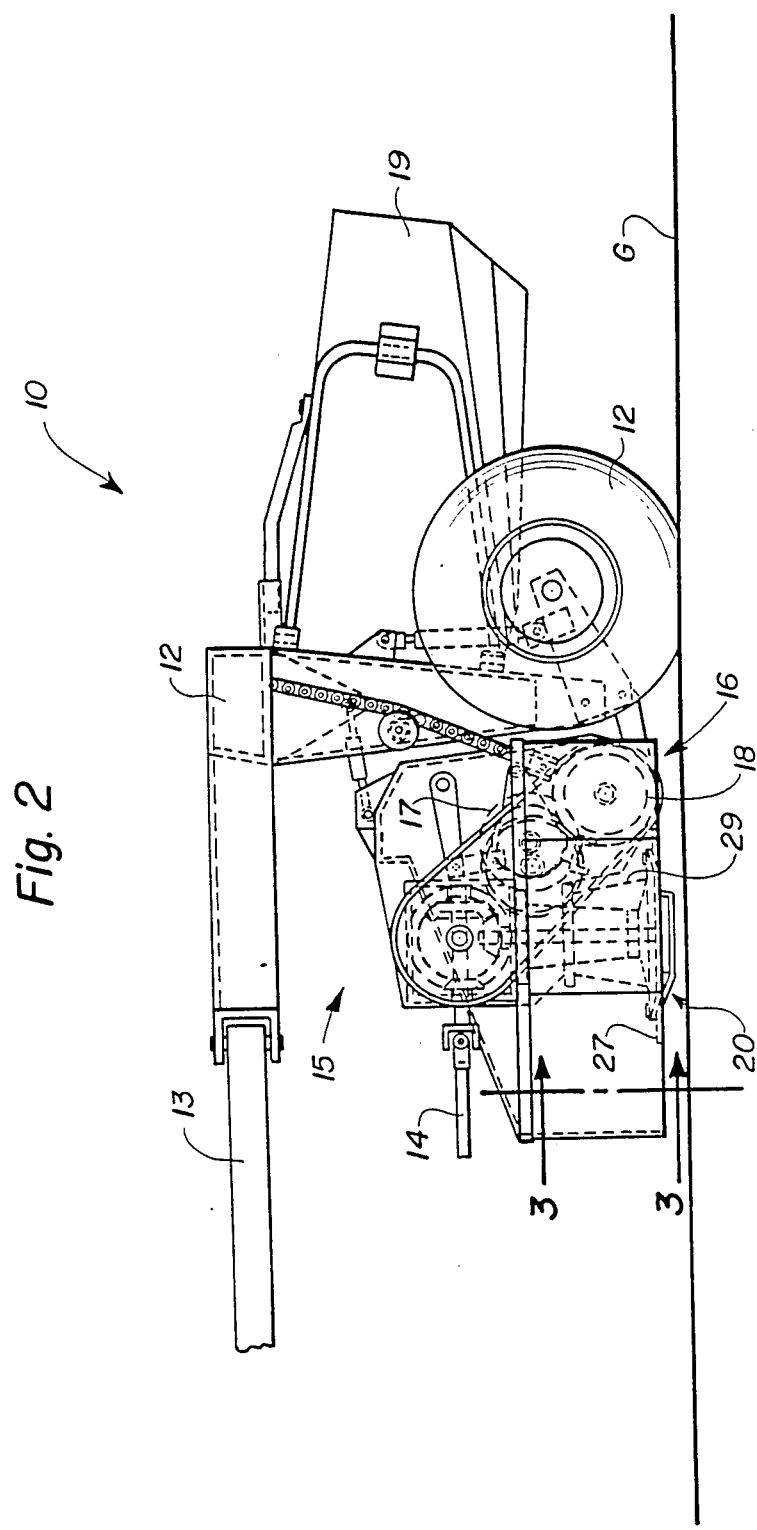
FIG. 2 is a left side elevational view of the disc mower-conditioner seen in FIG. 1.

Referring now to the drawings and, particularly, to FIG. 1, a top plan view of a crop harvesting machine, commonly referred to a disc mower-conditioner, incorporating the principles of the instant invention, can be seen. Any left and right references are used as a matter of convenience and are determined by standing at the rear of the machine, facing the forward end, the direction of travel. As best seen in FIGS. 1 and 2, the disc mower-conditioner 10 is supported over the ground G by a wheeled frame 12. The embodiment as shown in the drawings is commonly referred to as a pull-type machine and, therefore, is equipped with a draft tongue 13 and a PTO driveline 14 to input rotational power from a pulling tractor (not shown).

The machine 10 is provided with a header 15 floatingly supported from the frame 12 in a conventional manner. The header 15 is provided with a disc cutterbar 20, described in further detail below, and a conditioning mechanism 16, including an upper roll 17 and a lower roll 18, positioned immediately rearwardly of the cutterbar 20 to receive and condition severed crop. The discharge of conditioned crop material from the conditioning mechanism 16 is engaged with the rearwardly converging baffle shields 19 that deposit the conditioned crop into a consolidated windrow upon the ground G in a conventional manner.

Figure 3:
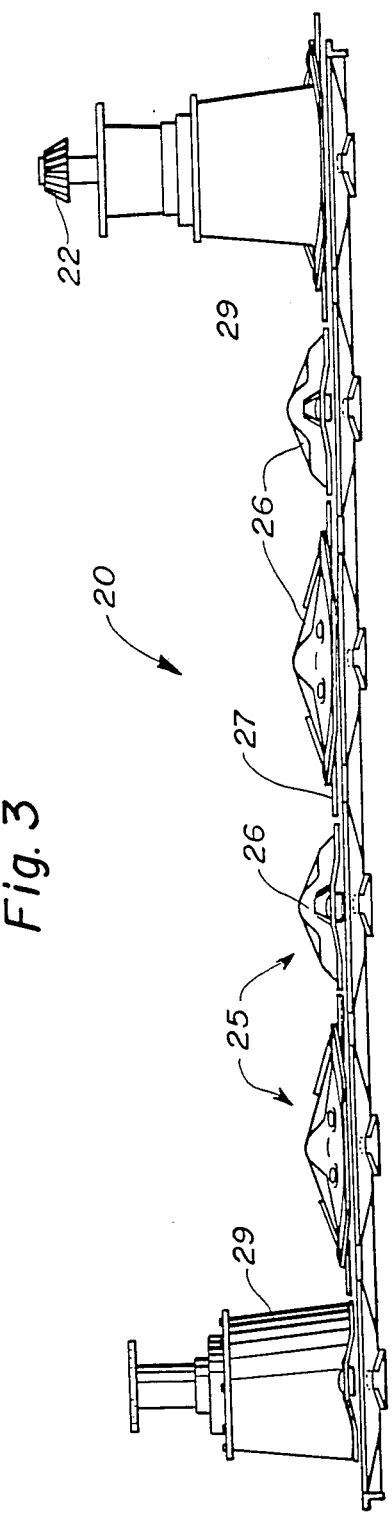
FIG. 3 is a view of the disc cutterbar as seen along lines 3—3 of FIG. 2, with the extraneous harvester structure removed.
Figure 4:
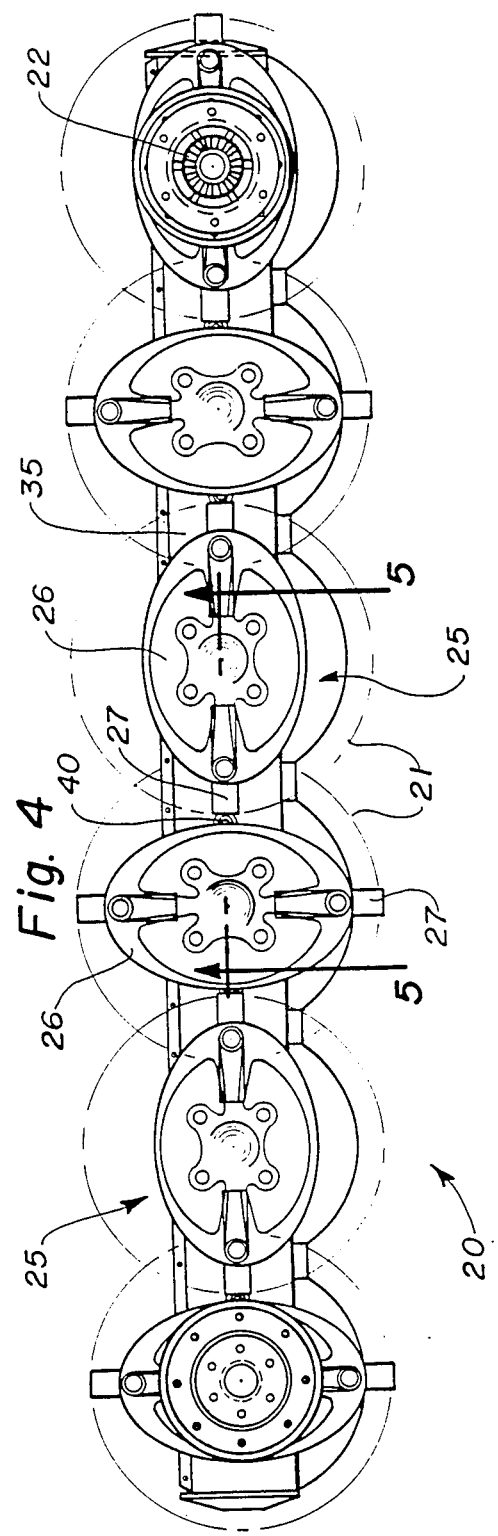
FIG. 4 is a top plan view of the disc cutterbar seen in FIG. 3.

An overall view of the disc cutterbar 20 is best seen in FIGS. 3 and 4. The power input shaft 22 receives rotational power from the PTO driveline 14 and transfers the rotational power through a series of intermeshing power transmission gears described in greater detail below and rotatably powers the operation of the disc cutter assemblies 25, each of which has having a pair of outwardly extending knives 27 that engage the standing crop material and, by rotation along a circular arc exemplified arc 21, affects a severing thereof from the ground. The disc cutter assemblies 25 at the respective ends of the cutterbar 20 are provided with a hat-shaped divider drum 29 to facilitate the flow of crop material over the cutterbar 20 and inwardly toward the conditioning mechanism 16.

Referring now to FIGS. 3—5, particularly to FIG. 5, the structural details of the power transmission train 30 and the disc cutterbar 20 can best be seen. The description of the protective components of the disc cutterbar 20 is provided in greater detail in co-pending patent application entitled "Disc Cutterbar Construction", filed 03/31/86, 1986, and assigned Ser. No. 846,650, Each disc cutter assembly 25 is provided with a detachably connected disc cutter 26 which carries the knives 27 for engagement with the standing crop material. The power input shaft 22 delivers rotational power to a series of tranmission gears 30, including a drive gear 32 associated with each respective disc cutter assembly 25 and a pair of idler gears 34 mounted between adjacent drive gears 32. The provision of two idler gears 34 between adjacent drive gears 32 permits the adjacent disc cutter assemblies 25 to be rotated in opposing directions.

Referring now to FIGS. 5 and 6, the idler gear mounting apparatus 40 can best be seen. The transmission casing 35 is formed with an indentation 36 in both the upper surface portion 37 and the lower surface portion 38 through which the mounting hole passes. Each idler gear 34 is rotatably mounted on the apparatus 40 by a bearing assembly 41. The mounting apparatus includes a spacer member 42 having a lip portion 43 and a shank portion 44 defining a recessed portion 45. The spacer member 42 extends completely through the transmission casing 35 and engages both the upper surface portion 37 and the lower surface portion 38 along the shank portion 44 to provide radial support for the spacer member 42 and thus the mounting apparatus 40. The inner race of the bearing assembly 41 is mounted on the shank portion 44 of the spacer member 42 between the upper surface portion 37 and the lower surface portion 38.

To fix the mounting apparatus 40 in place on the transmission casing 35, a bolt 46 passes through the spacer member 42 such that the head portion 47 of the bolt 46 is received within the recessed portion 45 of the spacer member 42. A specially formed securing member 48 is threadably engaged with the bolt 46 to tightly draw the mounting apparatus 40 together. The securing member 48 engages the lower surface portion 38 of the transmission casing 35 while the lip portion 43 of the spacer member 42 engages the upper surface portion 37 of the transmission casing to permit the mounting apparatus 40 to squeeze the casing 35 against the bearing assembly 41. The special shape of the securing member 48 fits within the shank portion 44 of the spacer member 42 and extends outwardly thereof to engage the lower surface 38 of the casing 35. O-rings 49 positioned between the lip portion 43 and the upper surface portion 37, as well as between the securing member 48 and the lower surface portion 38 and between the securing member 48 and the shank portion 44 seal the idler gear mounting apparatus 40 against the transmission casing 35 to prevent the loss of fluid from within the casing 35.

Figure 7:
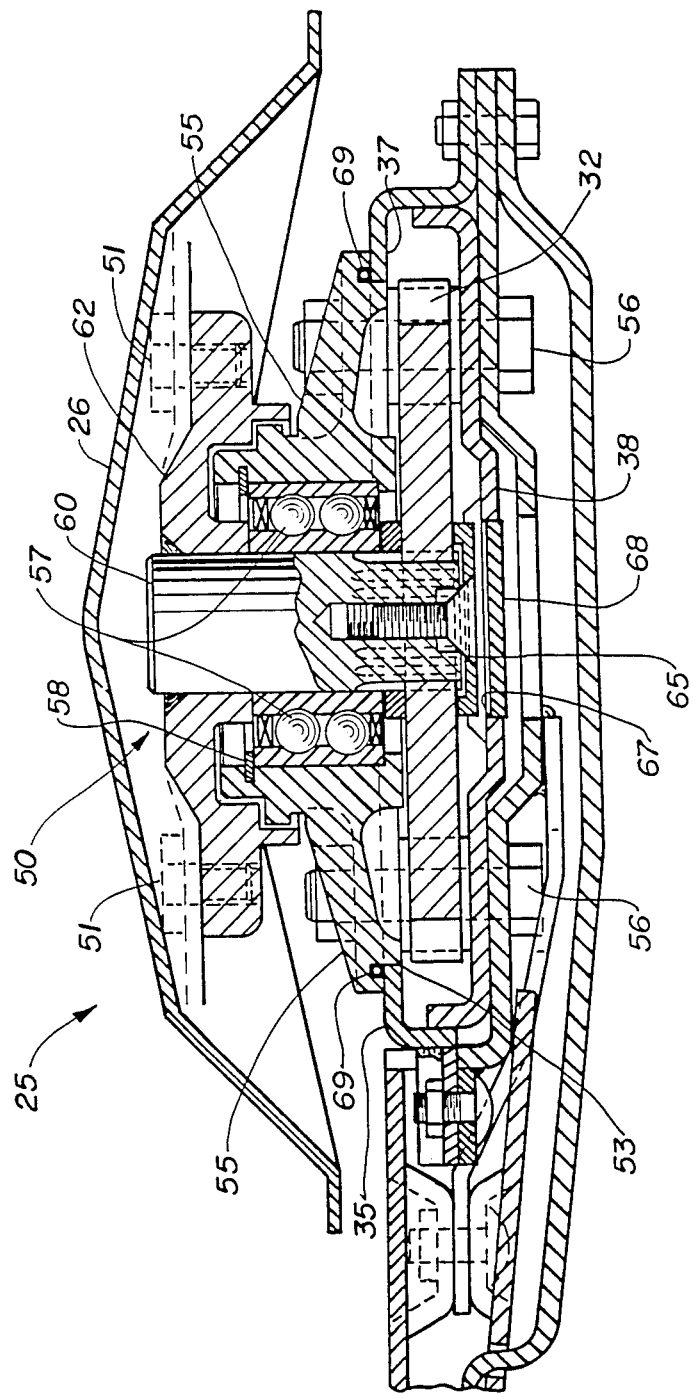
FIG. 7 is an enlarged partial cross-sectional view of the disc cutterbar taken along lines 7—7 of FIG. 5 to show the structural details of the disc cutter rotor assembly.

Referring now to FIGS. 5 and 7, the structural configuration of the disc cutter assembly 25 can best be seen. The disc cutter members 26 are detachably mounted to a rotor assembly 50 by fasteners 51. The upper surface portion 37 of the transmission casing 35 is provided with an access opening 53 through which the rotor assembly 50 extends into the casing 35. The rotor assembly 50 includes a bearing housing 55 detachably mounted on the upper surface portion 37 of the casing 35 by a plurality of bolts 56 extending entirely through the transmission casing 35 and engaging the lower surface portion 38. The bearing housing 55 mounts a bearing assembly 57 which is removably secured by a snap ring 58 to retain the bearing assembly 57 in place with respect to the housing 55.

The bearing assembly 57 rotatably mounts a shaft member 60 for rotation relative to the bearing housing 55. The shaft 60 extends entirely through the bearing housing 55 and projects both above and below the bearing housing 55. A hub 62 is welded to the top of the shaft member 60 for rotation with the shaft 60 above the bearing housing 55. The disc member 26 is connected to the hub 62 by fasteners 51. The drive gear 32 for the disc cutter assembly 25 is splined onto the bottom of the shaft member 60 and positioned within the transmission casing 35 for intermeshed engagement with the adjoining idler transmission gears 34. The drive gear 32 is secured to the shaft member 60 by a fastener and washer assembly 65 which is threaded into the shaft member 60.

The lower surface portion 38 of the transmission casing 30 is provided with a hole 67 therein to gain access to the fastener and washer assembly 65 to permit a disconnection of the drive gear 32 from the shaft member 60 without removing the rotor assembly 50 from the transmission casing 35. The hole 67 is sealed with a seal 68 to maintain the fluid tight integrity of the transmission casing 35. An O-ring seal 69 is positioned between the bearing housing 55 and the upper surface portion 67 of the casing 35 to seal the access opening 53 and prevent leakage therefrom.

The component parts of the rotor assembly 50 can be assembled in the following manner. The bearing assembly 57 is first pressed into the bearing housing 55 and retained in place by the snap ring 58. After supporting the inner race of the bearing 57, the shaft member 60 is pressed through the inner race. The drive gear 32 can then be splined on to the shaft member 60 and retained in place by the fastener and washer assembly 65. Removal of the component parts from an assembled bar can be done by accessing the fastener and washer assembly 65 through the hole 67 and the drive gear 32 removed from the shaft member 60 before the rotor assembly 50 is removed from the casing 35. The bearing 57 can be replaced in the opposite manner from the assembly thereof as noted above.

In operation, the idler gear mounting apparatus 40 permits a stable, substantial mounting apparatus for the idler gear 34 while permitting an ease of serviceability to the bearings 41 and gears 34. The rotor assembly 50 permits the cutterbar 20 to retain a low, thin profile to facilitate the flow of severed crop material over the cutterbar 20, yet provides a disc cutter assembly 25 that can be easily serviced and permit replacement of any component part thereof.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. In a disc cutterbar for severing standing crop material from the ground and having a plurality of disc cutter assemblies rotatably mounted on a transmission casing housing a plurality of intermeshed power transmission gears including a drive gear associated with each respective disc cutter assembly to effect rotation thereof and idler gears positioned between said drive gears to transfer rotational power between said drive gears, each of said idler gears being rotatably mounted within said transmission casing by apparatus extending between an upper surface member and a lower surface member of said casing, an improved idler gear mounting apparatus comprising:
   a spacer member positioned within an opening through said transmission casing and engaging said upper surface member, said lower surface member and a bearing rotatably supporting said idler gear on said spacer member;
   a fastener extending through said spacer member and having a head portion engaging said spacer member and positioned adjacent one of said casing surface members; and
   a securing member releasably engaged with said fastener and engaged with the other of said casing surface members, the engagement of said securing member with said fastener being operable to tightly fix said mounting apparatus between said upper and lower surface members.

2. The disc cutterbar of claim 1 wherein said spacer has a lip portion engageable with said one of said casing surface members to restrict the passage of said spacer member through said casing.

3. The disc cutterbar of claim 2 wherein both the upper surface member and the lower surface member have corresponding indentations through which said opening passes.

4. The disc cutterbar of claim 3 wherein said spacer member is radially engaged with both said upper and said lower surface members.

5. The disc cutterbar of claim 4 wherein both said spacer 2 member and said securing member are sealingly engaged with said transmission casing to prevent the leakage of fluid therefrom.

6. The disc cutterbar of claim 5 wherein said spacer member includes a recessed portion to receive the head portion of said fastener.

7. A mounting apparatus for rotatably mounting an idler gear within a transmission casing between an upper surface portion thereof and a lower surface portion, comprising:
   a spacer member positioned within an opening through said transmission casing and engaging said upper surface portion, said lower surface portion and a bearing rotatably mounting said idler gear on said spacer member, said spacer member having a lip portion engaging said upper surface portion and a shank portion radially engaging said lower surface portion;
   a fastener having a head portion engaging said spacer member adjacent said upper surface portion, said fastener extending at least partially through said transmission casing; and
   a securing member threadably engaged with said fastener and engaging said lower surface portion to permit said mounting apparatus to tighten and fixedly mount said idler gear within said transmission casing.

8. The mounting apparatus of claim 7 wherein said spacer member defines a recessed portion to receive said head portion of said fastener.

9. The mounting apparatus of claim 8 wherein said spacer member and said securing member are sealingly engaged with said transmission casing to prevent a loss of fluid therefrom.

* * * * *